United States Patent [19]

Lenhart

[11] Patent Number: 4,730,955

[45] Date of Patent: Mar. 15, 1988

[54] DIVERGENT SINGLE FILER

[75] Inventor: Ronald A. Lenhart, Lakewood, Colo.

[73] Assignee: Precision Metal Fabricators, Inc., Arvada, Colo.

[21] Appl. No.: 862,708

[22] Filed: May 13, 1986

[51] Int. Cl.⁴ ............................................. B65G 51/00
[52] U.S. Cl. ........................................ 406/88; 406/86
[58] Field of Search .................... 406/86, 88; 198/447, 198/452, 453

[56] References Cited

U.S. PATENT DOCUMENTS

| 3,999,806 | 12/1976 | Hurd | 406/88 |
| 4,347,022 | 8/1982 | Lenhart | 406/88 |
| 4,369,005 | 1/1983 | Lenhart | 406/88 |
| 4,456,406 | 6/1984 | Lenhart | 406/88 |
| 4,462,720 | 7/1984 | Lenhart | |
| 4,561,806 | 12/1985 | Lenhart | |

FOREIGN PATENT DOCUMENTS 0117633 9/1984 European Pat. Off. .

Primary Examiner—Sherman D. Basinger
Assistant Examiner—Lynn M. Fiorito
Attorney, Agent, or Firm—Fields, Lewis, Pittenger & Rost

[57] ABSTRACT

A single file apparatus is provided for highly etched containers wherein a mass of containers is separated into two single file rows, the single file rows are merged into nesting relationship and the nested rows of containers separated and further merged into single file. The mass of containers are separated into separate rows along each side of an air conveyor having an imperforate cover forming a high pressure area between the rows. The differential pressure in this high pressure area is lower at the upstream end than at the downstream end so that containers which move into this central area will recirculate upstream. The separated rows of containers are brought into an alignment zone and arranged in nested relationship and are merged into an equilateral triangular configuration with mutually touching side edges in a nesting section within the alignment zone. The containers then are accelerated into a high pressure buffer section of the alignment zone where they are separated from each other and converged into single file. This buffer section eliminates the possibility of transmission of upstream forces caused by engagement of the single file containers by downstream equipment so that such forces will not be transmitted back through the single file apparatus.

22 Claims, 16 Drawing Figures

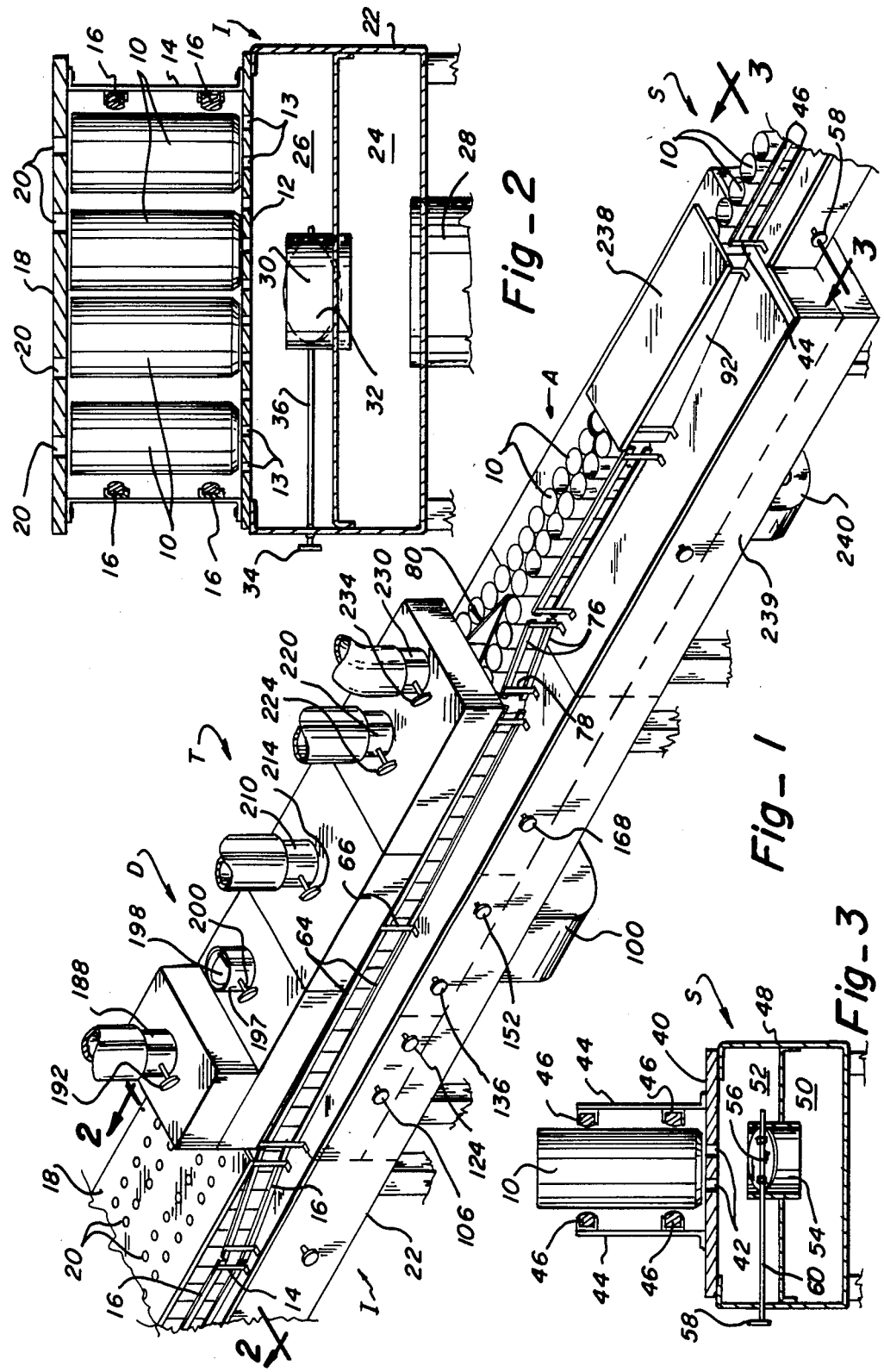

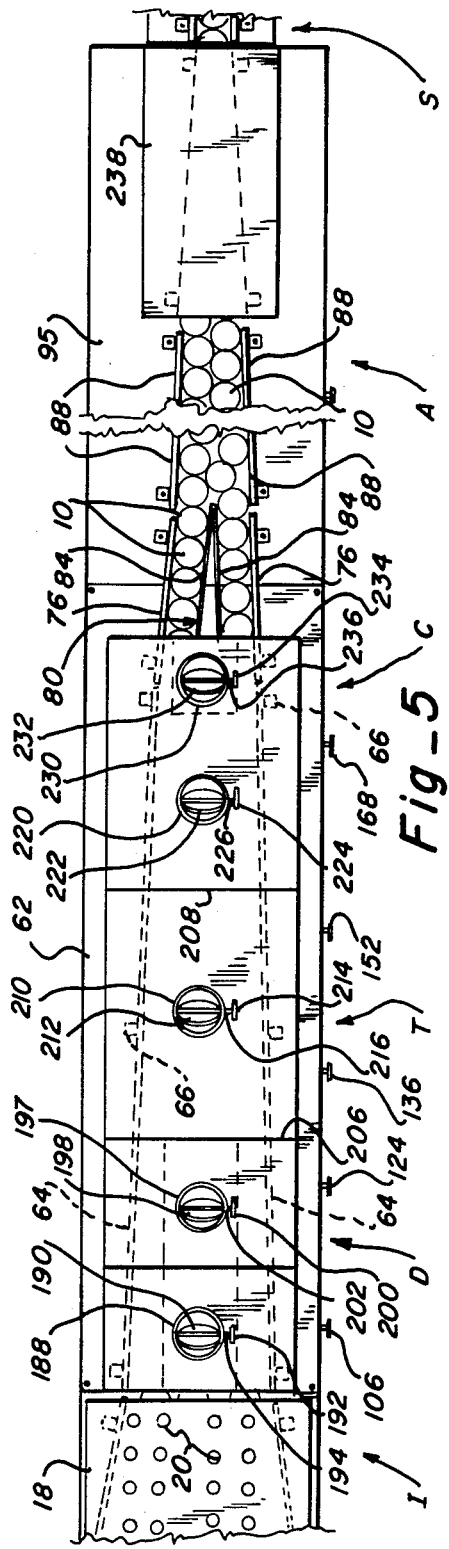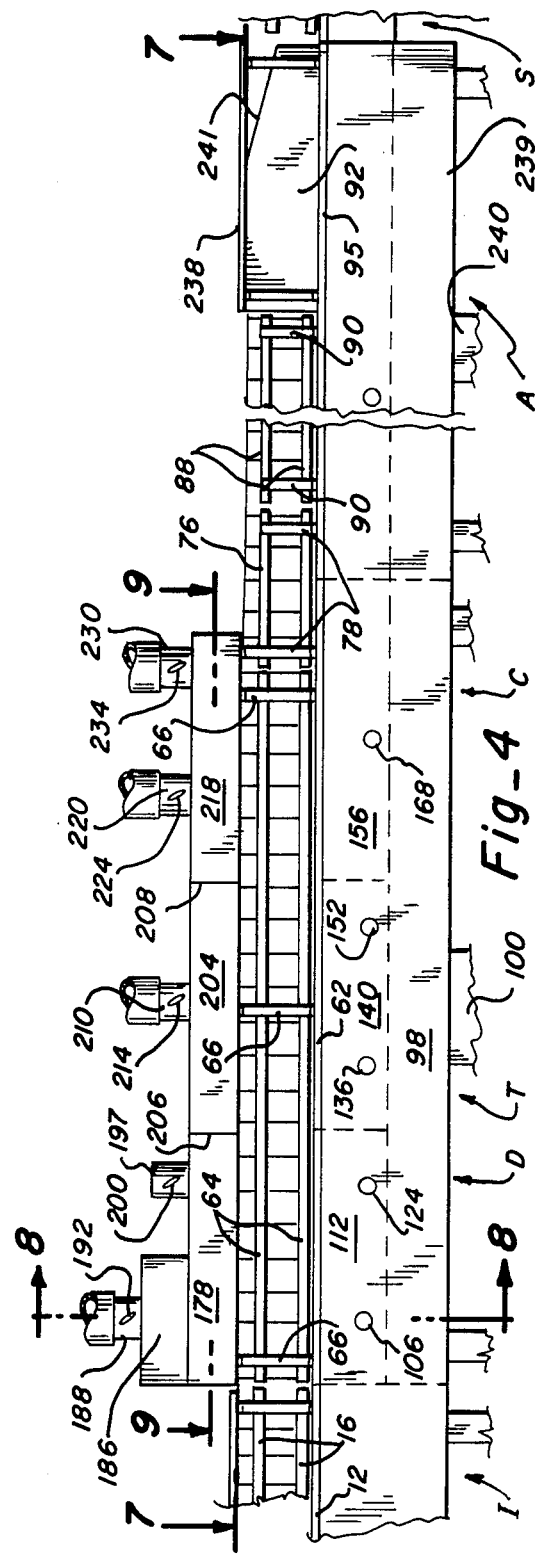

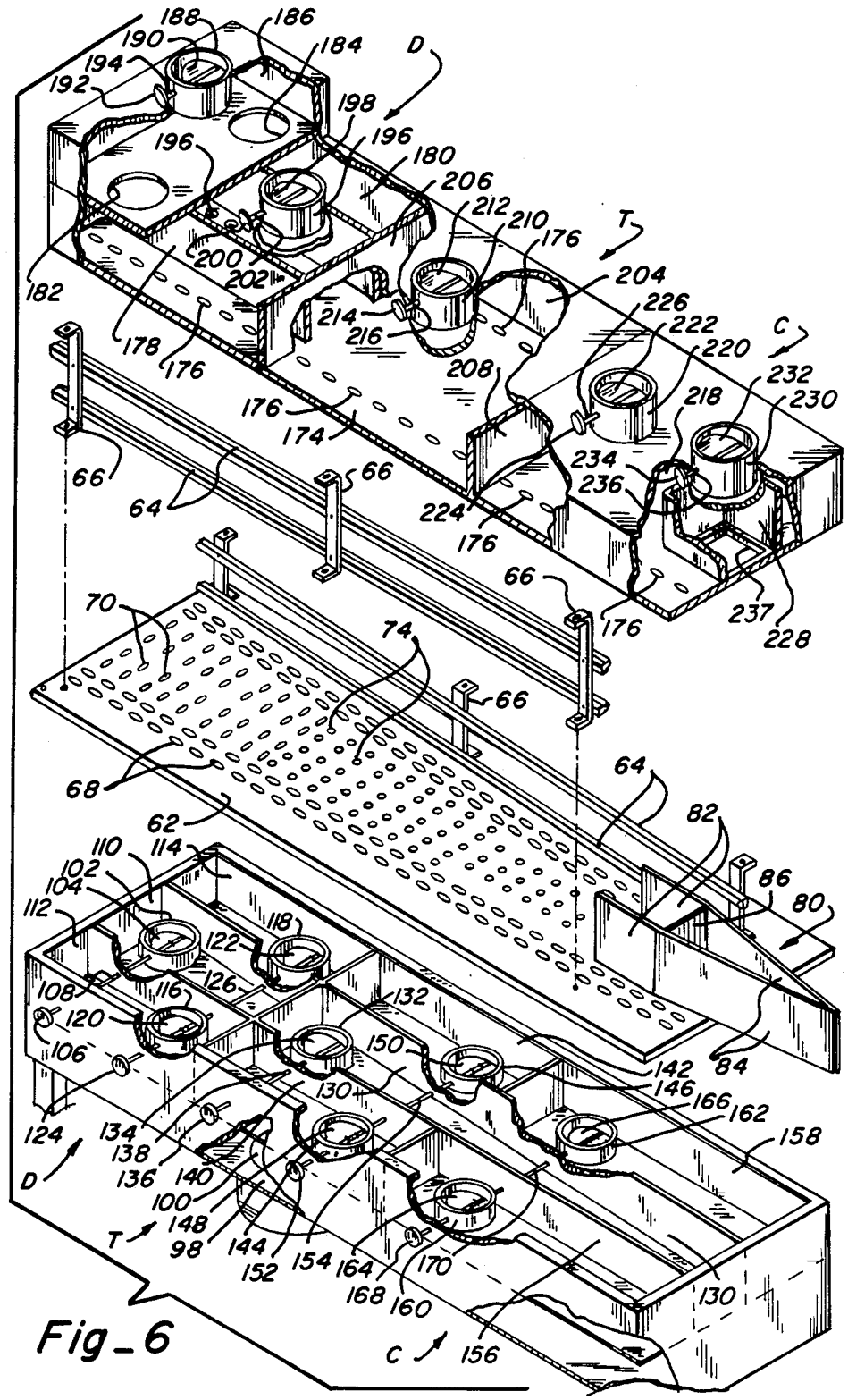
Fig_6

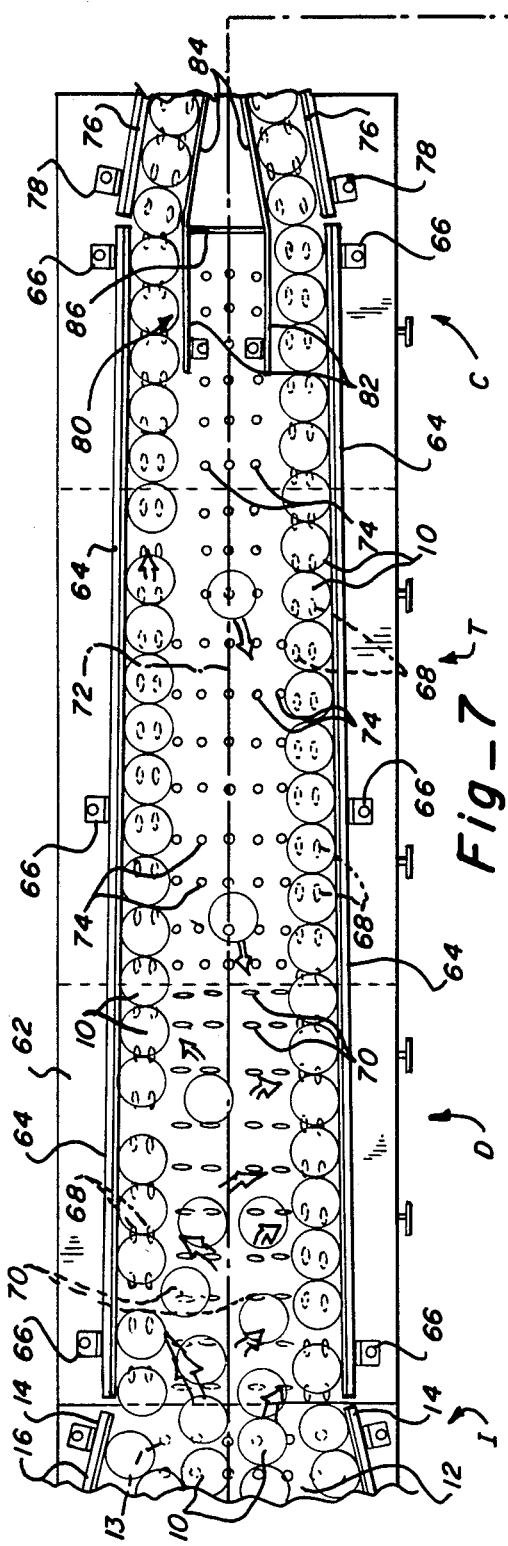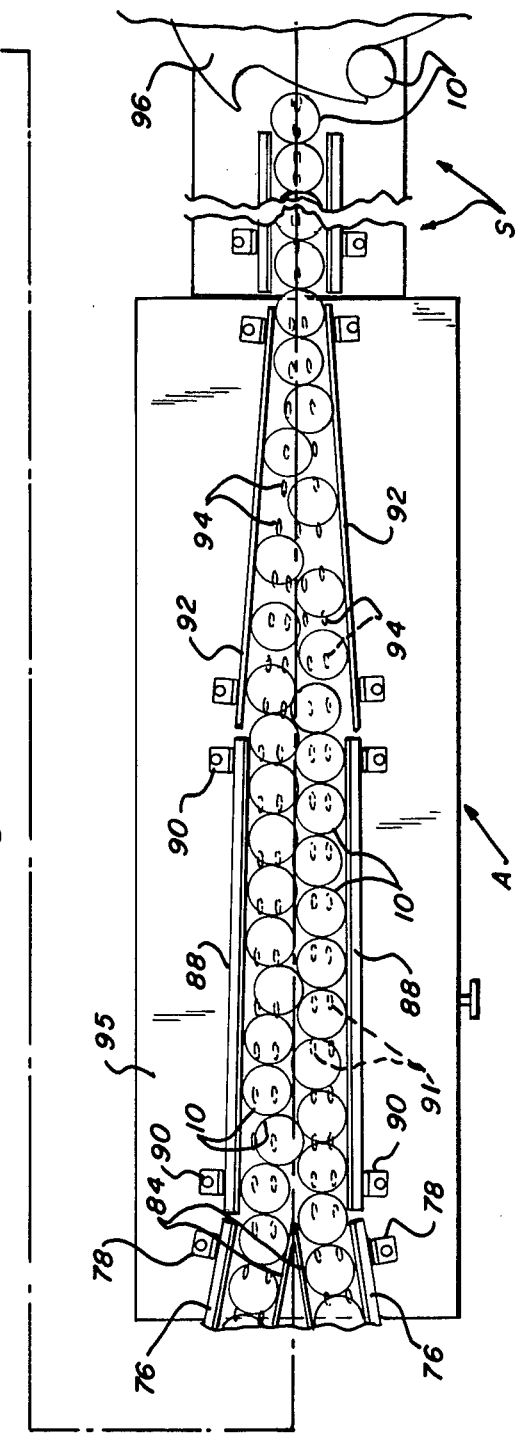
Fig-7

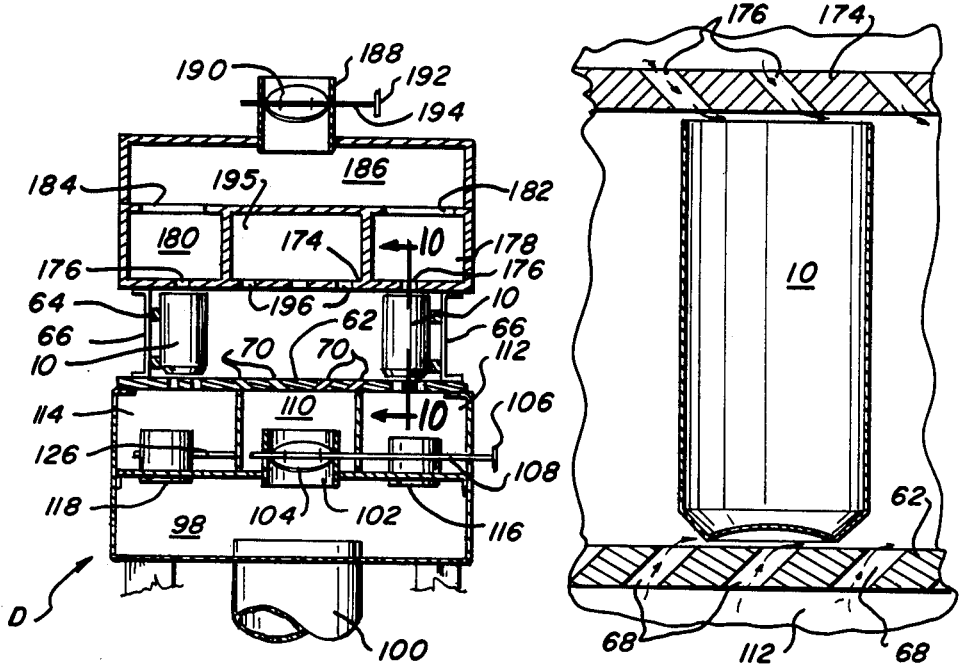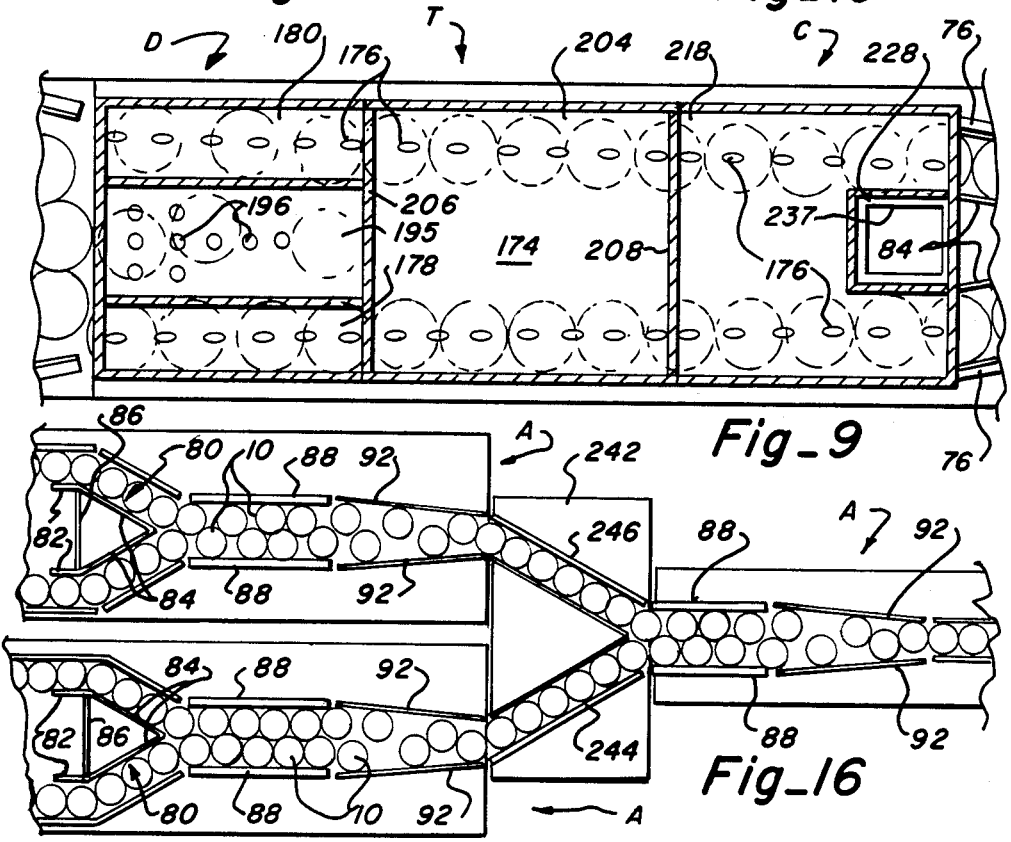

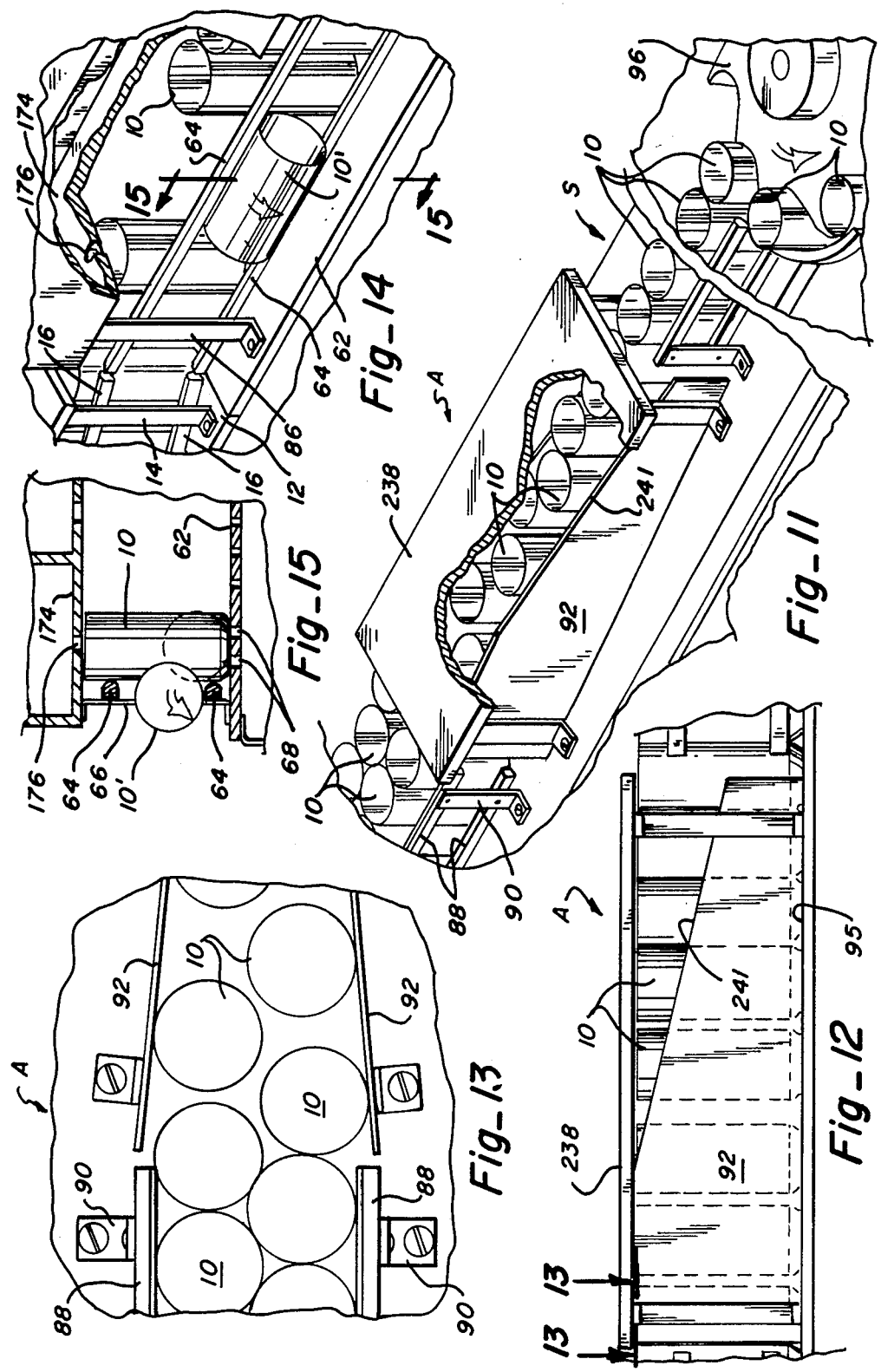

DIVERGENT SINGLE FILER

TECHNICAL FIELD

This invention relates to a device for moving a mass of empty beverage containers into single file and more particularly to a device for handling highly etched containers which do not easily slide or rotate relative to each other.

BACKGROUND ART

There are many occasions within a can manufacturing plant in which a mass of containers needs to be fed into a single line or multiple single lines for supplying the containers to, decorators, base coaters and other apparatus in the plant which must perform an operation on or with respect to the container. As the development of higher speed apparatus for performing all these functions is developed, it becomes necessary to develop apparatus for providing the containers to the equipment at greater speeds. Until fairly recently, single filing was done by a variety of mechanical single filers. However, more recently a significant breakthrough in the handling of containers occurred with the development of air conveyors and single filing devices which support the containers on a layer of air and use air as a propelling force for manipulating and moving the containers.

One such single filing apparatus is disclosed in my U.S. Pat. No. 4,462,720 for "Air Table System" which issued on July 31, 1984. In this device, the containers are supported on a table by a layer of air provided by air jets slanted in the downstream direction toward a single file conveying zone. An imperforate cover is placed above the surface of the table a distance slightly greater than the longitudinal dimension of the objects being transported and is positioned over at least a portion of the single file conveying zone. Blow-back jets are connected to a source of air under pressure for supplying air in the single file conveying zone in opposition to the direction of normal flow of the object. By the use of this apparatus, a mass of containers can be rearranged into a single file arrangement for discharge at the downstream end of the table.

Another single filer is shown in my U.S. Pat. No. 4,561,806 for "Vertical Single Filer Conveyor System" which was granted Dec. 31, 1985. In this apparatus, the containers are fed from a mass onto a table which has at least three zones extending from an upstream location. The containers are supported and moved by a prearranged pattern of flotation air jets. In addition, a row of acceleration jets, which are larger in size than the flotation jets, are located in the table adjacent to and spaced in parallel relation to converging sides of the table to form two converging rows of acceleration jets. Means is provided to incrementally increase the volume and velocity of air through the acceleration jets between each of the three zones from the upstream location to the downstream location to accelerate and longitudinally separate the objects as they move along the table from the upstream location to the downstream location so that the converging of the sides coacts with the acceleration jets to converge the longitudinally separated objects in a prearranged pattern to bring them into single file. This device has been found to be very satisfactory for placing smooth decorated cans in single file at relatively high speeds.

Neither of these devices will work with highly etched containers. During the manufacturing process, the containers are run through an acid wash which etches the outer surface of the containers so that the decorative coating will adhere to the surface of the container. Furthermore, because of environmental concerns, the acid cannot now freely be dumped and therefore it is impossible to control the amount of etching on the cans as was previously possible. In other words, the acid solution must be strong enough to provide the minimum etching required but if there is a stall in the line and the container stays in the etching solution too long, the acid cannot be dumped but rather the container just becomes more highly etched. This creates great problems in manipulating the containers because the adjacent contacting edges of the etched containers act like little gear teeth and interlock with each other so that the containers want to rotate with each other rather than moving individually and sliding past each other.

DISCLOSURE OF THE INVENTION

In accordance with this invention, a method and apparatus is provided wherein the mass of containers are separated when moved relative to each other but are brought into nesting relationship when they can be moved as a group and then again separated from each other for further manipulation to bring them into single file. Thus, the occurrence of a situation in which the containers are slid past each other or rotated with respect to each other is minimized.

This can be accomplished by the use of an apparatus including a table having a centerline and a plurality of zones extending from the upstream location to the downstream location. The table has a surface, first and second opposite side edges and an underside with a prearranged pattern of jets communicating the surface and the underside. A plenum is connectable to a source of air under pressure and attached to the underside of the table surface. Means for separating the articles into two separate spaced rows at a first zone is provided. Means is also provided for conveying the spaced rows through a second zone and bringing them into closer but still separated condition. Means are further provided for converging the spaced rows and moving them through a third zone and bringing them into nested relationship and moving them as a unit into a fourth zone. Means is provided for subsequently accelerating the articles and separating them and converging them into single file in the fourth zone.

More particularly, the device includes a jet board which has jets which are angled downstream along each side edge of the jet board for conveying separate rows of containers. At the upstream end of the jet board between the previously mentioned rows of jets are jets which are directed outwardly from opposite sides of the centerline toward the sides of the table to move the containers into separate rows on opposite sides of the table. Downstream of this set of jets are additional flotation jets which are substantially perpendicular for supporting containers that move into the space between the rows. Air is supplied to the jet board by means of a master plenum which is connected to separate plenums in each zone. In a first zone, air is supplied to the driving jets and is controlled by a common control and a separate section provides air to the diverging jets. Similarly, in the second zone a common control provides air to the driving jets at much higher pressure so as to urge the separated rows of containers downstream and hold them tightly against each other. A center section is provided with a separate control in the second zone at a much lower air pressure for providing air to the vertical jets for supporting any containers that move into this central area. This section is common with a similar section in the third zone. The third zone is also provided with common controls for providing air to the driving jets at a lower pressure. The containers in each row provide side barriers to the escape of air as does an imperforate cover which is positioned over the top of the table. This above ambient air pressure along the center of the table causes the containers to be held in separate rows on opposite sides of the table.

A longitudinal row of driving jets is provided along each edge of the cover so as to be positioned over each row of containers and to provide a driving force at the top of the containers to maintain them in upright position. In the first zone, air is provided to these driving jets through a manifold arrangement from a common valve. A controllable exhaust is provided over the divergent jets so that the air pressure at this location can be adjusted. By this means, the number of containers that move into the area over the vertical jets can be regulated. Additional controls are provided for the second and third zones to provide air at different pressures through the driving jets in the top cover. Finally, at the downstream end of the table a baffle is provided and air is introduced within the baffle at the center of the table at high volume but low velocity and at a greater pressure than the pressure at the exhaust valve so that containers which move into the center section will be conveyed rearwardly in the opposite direction to the movement of the containers in the spaced rows.

The spaced rows of containers are converged in a fourth alignment zone wherein they are brought into two nested rows wherein the containers are confined to an equilateral contiguous relationship wherein all side edges are touching. This arrangement assures that the containers move into the next area in a predictable uniform pattern for subsequent rearrangement in single file.

Next the containers are accelerated within a wider buffer area of the alignment zone so as to separate them each from the other whereupon they are converged by converging imperforate side walls into single file. The sidewalls are tapered from a solid top cover toward the downstream end so as to provide an increasing area for escape of air so that the pressure in the downstream direction is reduced from that found at the upstream end of the buffer section. Since the containers are completely separated from each other in this buffer section, the containers upstream from them are completely unaffected by any momentary reverse movement of the containers in single file, as by being engaged by the arm of a decorator which sequentially takes the cans from the single file row.

From the foregoing, it can be seen that a method and apparatus is provided which allows for the handling of highly etched containers whereby they can be conveyed in single file at high speed. The containers are separated from each other when they are to be manipulated into rows, the rows are converged and then the converged or nested rows are separated for rearranging the containers into single file. This separation of containers during each rearranging step minimizes any rubbing or inhibition of movement of one container by an adjacent container. Additional advantages of the invention will become apparent from the description which follows, taken in conjunction with the accompanying drawings.

BRIEF DESCRIPTION OF THE DRAWINGS

FIG. 1 is a perspective view of a divergent single filer constructed in accordance with this invention;

FIG. 2 is an enlarged horizontal section, taken along line 2—2 of FIG. 1, showing the plenum arrangement for the air table upstream of the divergent single filer;

FIG. 3 is an enlarged horizontal section, taken along 3—3 of FIG. 1, showing the plenum arrangement in the single file zone downstream of the divergent single filer;

FIG. 4 is a side elevation of the divergent single filer of FIG. 1;

FIG. 5 is a plan elevation of the divergent single filer of FIG. 4;

FIG. 6 is an exploded perspective view of the first three zones of the divergent single filer, with parts broken away for clarity of illustration;

FIG. 7 is an enlarged top plan view of the air table of the divergent single filer showing the arrangement of air jet openings and the movement of containers;

FIG. 8 is an enlarged vertical section, taken along line 8—8 of FIG. 4, showing details of the upper and lower air plenums;

FIG. 9 is a horizontal section, taken along 9—9 of FIG. 4, showing further details of the upper plenums;

FIG. 10 is an enlarged vertical section, taken along line 10—10 of FIG. 8, showing the angles of the upper and lower driving jets and the movement of a container under the influence of air issuing from those air jets;

FIG. 11 is an enlarged fragmentary perspective view of the buffer section of the divergent single filer of FIG. 1, with parts broken away for clarity of illustration;

FIG. 12 is a side elevation of the buffer section of FIG. 11;

FIG. 13 is an enlarged horizontal section, taken along line 13—13 of FIG. 12 showing the enlarged portion of the alignment zone which allows the containers to separate from each other;

FIG. 14 is a fragmentary perspective view of the first zone of the divergent single filer of FIG. 1 showing a tripped container being discharged between the side rails;

FIG. 15 is a vertical section, taken along line 15—15 of FIG. 14, showing a container as it is forced over the lower side rail; and FIG. 16 shows the apparatus of this invention combined in multiple units.

BEST MODE FOR CARRYING OUT THE INVENTION

In accordance with this invention, a divergent single filer is provided which receives highly etched containers en masse from an infeed table I and arranges them in single file for discharge into a single file zone S. The divergent single filer includes at its upstream end a diverging zone D in which the containers are arranged loosely in two spaced rows and fed to a transporting zone T wherein the containers in each row are forced into tight contiguous contact. The containers then move into a converging zone C wherein the rows are brought into close adjacency. The containers then feed into an alignment zone A having a nesting section where they are nested with each other and arranged in equilateral triangular contacting relationship. They then move into a high pressure buffer section where they accelerated, separated, and then merged into single file. All of this is accomplished without subjecting the containers to substantial frictional contact which would inhibit rotation and sliding with respect to each other.

Containers 10 are supplied en masse along a table surface 12 of infeed table I, which surface has a pattern of air jet openings 13 for supporting and moving the containers toward the divergent air single filer. The infeed table I includes supports 14 on opposite sides thereof for vertically spaced guide rails 16, as best seen in FIG. 2. A top cover 18 is imperforate except for spaced openings 20. The solid area between the openings creates high pressure areas for separating the containers into a loose mass as they are fed into the divergent single filer.

A plenum 22 is provided under table surface 12 and is divided into a lower supply chamber 24 and an upper portion 26, as shown in FIG. 2. Air is supplied to the lower portion 24 through an inlet 28. This air in turn is supplied through a duct 30 having a damper 32 therein regulated from a control knob 34 connected to the damper by rod 36.

A similar structure is shown in FIG. 3 for the single file zone S which includes a surface 40 having jet openings 42 for conveying the containers 10 to another station. The container is held in aligned position by side guides 44 which includes spaced guide rails 46, as shown. The jet openings 42 communicate with a plenum 48 having a lower portion 50 and an upper portion 52 interconnected by duct 54. The duct 54 has a damper 56 which is controlled by a knob 58 connected thereto by rod 60.

An overview of the operation of the apparatus of this invention can be had with reference to FIG. 7. As seen in the upper left-hand portion of this figure, the containers 10 are supplied en masse on air table 12, the containers being supported by air from jets 13 which also move the containers in the downstream direction. As previously mentioned with respect to FIG. 2, the cover 18 together with openings 20 allow high pressure areas to form between the openings which cause the containers to be spread out across the table as they enter diverging zone D of the divergent single filer. The divergent single filer has a table surface 62 which extends across the single filer and the length of the diverging zone, the transporting zone and the converging zone. A pair of spaced guide rails 64 are provided on opposite sides of table surface 62 and are mounted on supporting brackets 66. These guide rails converge slightly from the upstream end to the downstream end and are spaced apart at the upstream end a distance at least greater than three container diameters but preferably slightly greater than four container diameters to accommodate the mass of containers from the infeed table I. Along each side, adjacent the inside edge of the guide rails, are a pair of spaced rows of driving jets 68 which may be angled in a downstream direction from the vertical at approximately 60° and may be 7/64" in diameter. In the diverging zone D and between the rows of driving jets 68 are diverging jets 70 which are angled approximately 45° from the vertical in opposite directions along centerline 72 of FIG. 7, so as to cause containers in the central area to be moved toward the sides and into single file line over the driving jets 68. These diverging jets are conveniently approximately 5/64" in diameter.

In the center portion of the divergent single filer in both transporting section T and converging section C there are vertical flotation jets 74 which may also be 5/64" in diameter. The air pressure in the central area will be higher at the downstream end than at the upstream end, as discussed in more detail below, so that any containers which enter this area will be caused to float upstream along a film of air created by flotation jets 74 until they are over diverging jets 70 whereupon they will be moved laterally back into single file with the other containers along the rail. At the upstream end, the containers are in a relatively loose formation so that spaces form along the side rails to allow containers moving into the center from the infeed table I and any containers moving back upstream in the center of the divergent single filer to enter into the spaces between the containers at this location. In the transfer zone, the jets exert a greater force on the containers and hold them in closely adjacent configuration so that a substantially closed high air pressure area is formed by the containers along the side rails and the imperforate cover.

As the separated rows of containers move into the converging section, they are diverted toward each other by spaced guide rails 76, supported by brackets 78, which bring the containers into close adjacency as they enter the nesting area of alignment zone A. At this position, there is a baffle device 80 which has spaced baffle walls 82 which are each spaced from the respective side rails 64 a distance slightly greater than one container diameter and are interconnected with converging baffle walls 84, which come together at the end of converging rails 76 and are parallel thereto. A cross baffle wall 86 extends between the spaced baffle walls at the point of juncture between walls 82 and 84 and help define a high pressure area, as further discussed below. As best seen in FIG. 7, the containers align themselves along spaced side rails 64 and away from solid baffle walls 82. Since some air can escape around and between the containers through spaced side rails 64, the air pressure is higher between the containers and solid baffle walls 82.

The closely adjacent rows of containers 10 are guided next into nesting relationship in the nesting section of alignment zone A by spaced guide rails 88 which are supported by brackets 90. These guide rails converge slightly in the downstream direction so as to bring the containers into a contiguous equilateral triangular configuration, as shown in FIG. 7, at the downstream end of guide rails 88. The jets 91 between guide rails 88 can be vertical or angled forwardly at an angle between 5° and 40° to the vertical. Since there will be substantial force on these containers by the trailing containers which will hold them together, a strong driving force is not needed in this area. The purpose of the equilateral triangular configuration is to assure that the containers are always in the same precise alignment so as they are rearranged into single file, their movement is predictable and no jamming of the containers will occur. This is true because with this alignment one container always moves ahead of the next so that jamming cannot occur.

As the containers in the equilateral triangular configuration leave the downstream end of the guide rails 88, they enter a slightly wider area as defined by converging sidewalls 92 within the buffer section of alignment zone A. It will be noted, as best seen in FIG. 13, that the sidewalls at their upstream end are placed slightly further apart than the spacing between the inside of guides 88. The high pressure in this wider section causes the containers to separate laterally from each other as shown. Acceleration jets 94 in table surface 95 are at an angle between 20° and 60° to the vertical and have a diameter of 5/64". These acceleration jets 94 accelerate the containers so that each container is separate from the other and is not in contiguous frictional contact with the others as the converging sidewalls bring them into single file alignment as they move into the single file zone S. The containers may move from the single file zone to any other station, such as to a decorator wheel 96 which sequentially picks up the containers from the single file line. It will be understood, as this decorator wheel engages a container its arm will give a slightly upstream movement to the next adjacent container 10 which movement can be passed along through all of the containers. It would not be desirable to have this reverse motion passed upstream to the infeed table I and therefore, the spacing of the containers between converging sidewalls 92 provides an air buffer section, as discussed more fully below, so that this reverse movement of the single file containers is isolated from the containers which are upstream.

With that overview, a detailed review of the apparatus is in order. The plenum structure for the divergent zone, the transporting zone and the convergent zone are best shown in FIGS. 6, 8 and 9. A master plenum 98 extends under these three zones and is substantially contiguous therewith and has a plurality of plenum sections between it and table surface 62 as will now be described. The master plenum is supplied with air through an air inlet 100. The flow of air from the master plenum to the plenum sections is controlled by a series of dampers. For example, air is supplied to divergent jets 70 through an inlet 102 controlled by a damper 104 connected to a control knob 106 by a rod 108. The plenum section 110 corresponds in size to the surface area over which divergent jets 70 are located. Thus, the flow and pressure of air can be independently controlled to this section of the apparatus. Static air pressure of 1.0" to 1.5" in plenum section 110 has been found to be satisfactory.

Similarly, outside plenum sections 112 and 114 are each provided with a duct 116 and 118, respectively, communicating with master plenum 98. Each duct is provided with a baffle 120 and 122, respectively, operated by a control knob 124 off of a common control rod 126. In this manner, the volume of air passing through driving jets 68 and the pressure within plenum sections 112 and 114 can be uniformly controlled. It has been found that a static pressure of about 1.5" is satisfactory.

A second center plenum section 130 has a width substantially equal to that of center plenum section 110, but extends the remaining length of the plenum so as to be under flotation jets 74 to the downstream end. Air is supplied to this plenum section through a duct 132 which has a baffle 134 controlled by a knob 136, connected thereto by rod 138. A static pressure of about 1.5" has been found satisfactory in this plenum section. Outside plenum sections 140 and 142 are provided on either side of plenum section 130 within the transporting zone. These plenum sections supply air to the driving jets 68 in this zone of the apparatus. Air is supplied to these plenum sections through ducts 144 and 146, respectively. The ducts have baffles 148 and 150, respectively, operated by control knob 152 through a control rod 154. It is important that these driving jets drive the containers with substantial force to hold them in contacting relationship. Therefore, these plenum sections are supplied with air at approximately 5.0" static pressure.

Downstream of plenum sections 140 and 142 and within converging zone C are another pair of plenum sections 156 and 158 which also supply air to driving jets 68. The air to these plenum zones is supplied through ducts 160 and 162, respectively. Each duct has a baffle 164 and 166, respectively connected to a control knob 168 which operates the baffles through a control rod 170. The static pressure in these plenum sections need only be 1.5".

Upper plenums are also provided over the respective zones. The upper plenum sections are formed over an imperforate cover 174 which has a row of driving jets 176 on each side spaced over the rows of driving jets 68 in table surface 62. These jets are angled forwardly at an angle of approximately 45° and are 3/16" in diameter. Within the diverging zone, plenum sections 178 and 180 are formed over driving jets 176. These plenum sections each have an opening 182 and 184, respectively communicating them with a supply plenum 186 which receives air from an air supply through duct 188. The supply of air is controlled by a baffle 190 connected to a control knob 192 by a rod 194. Thus, the same amount of air at the same volume can be provided to driving jets 176 within divergent zone D. It has been found that a pressure of approximately 1.2" is satisfactory. Above divergent jets 70 and between plenum sections 178 and 180 is an exhaust plenum 195 having openings 196 through cover 174. More openings are provided at the upstream end of exhaust plenum 175 so the pressure will be lowest at the upstream end. The exhaust plenum 195 is connected to an exhaust duct 197. This exhaust duct has a baffle 198 controlled by control knob 200 through rod 202. This allows precise control of the air pressure in the center of the divergent zone and thereby allows control of the number of containers moving into the divergent zone from the infeed table I.

In the transporting zone T a plenum section 204 is defined by dividers 206 and 208 extending transversely within the plenum structure, as shown. Air is supplied to plenum section 204 through a duct 210 having a baffle 212 controlled by control knob 214 connected thereto through a rod 216. Air from this plenum is supplied to the driving jets 176 in this section and is supplied at a static pressure of approximately 2.5". It will be understood that the driving jets 176 are used to maintain the containers 10 in a substantially vertical position so that the bottom driving jets 68 operate at maximum efficiency in lifting, supporting and moving the containers downstream.

A third upper plenum section 218 is provided in the converging zone. Air is provided to this section through a duct 220 having a baffle 222 operated by control knob 224 through control rod 226. Plenum section 218 provides air to driving jets 176. It has been found that a static pressure of 1.0" is satisfactory for maintaining the containers in vertical position during this portion of travel.

The central portion of the divergent single filer is pressurized by air introduced through a housing 228 at the downstream end of the converging zone. Air is introduced into this housing through duct 230 having a control baffle 232 operated by a control knob 234 connected through rod 236. The air exits housing 228 through an opening 237 into the area defined by side baffles 82 and cross baffle 86. This air comes in at high volume but at low velocity and at a static pressure of 0.20" to 0.40". Thus, a differential pressure exists which decreases from baffle device 80 to exhaust duct 197 so that containers which may move into this central section will move upstream toward the lower pressure in the opposite direction of the movement of the rows of containers.

Although several plenums have been described for supplying air to driving jets 176, in some applications a single plenum for all jets may be satisfactory.

The alignment zone can best be understood by referring to FIGS. 11, 12 and 13 in conjunction with FIG. 7. As previously described, the slightly converging guide rails 88 bring the merged and nested rows of containers into equilateral triangular configuration in the nesting sections. As the containers move beyond the ends of guide rails 88 in the downstream direction, they move into a high pressure buffer section created by converging sidewalls 92 and imperforate cover 238. This high pressure area causes the cans to separate from each other and the wider spacing of the sidewalls 92 with respect to guides 88 provides additional room for lateral separation, as best seen in FIG. 13. Thus, at the upstream end of the buffer section the containers become separated due to the high pressure and are no longer into edge to edge contact. As the containers continue to be moved downstream by acceleration jets 94 they will be merged together by the sidewalls until they come into single file relationship. The air for acceleration jets 94 is supplied from plenum 239, which in turn is supplied by air through inlet 240. Because of the spacing between the containers, their highly etched surfaces are out of contact during merging. The spacing provides a buffer so that any momentary upstream movement of the single file row of cans caused by the arms of the decorator 96 engaging the individual cans will not be transmitted upstream to the containers in the rest of the apparatus. As can best be seen by viewing FIG. 12, the upper edge 241 of each sidewall 92 tapers downwardly away from top cover 238 to provide side openings of ever increasing size so that the air from acceleration jets 94 can escape to reduce the pressure in the downstream direction and assist the movement of the containers toward the single file position.

It should be understood that the foregoing pressures, jet sizes and angles are suitable for 12 ounce aluminum cans. It will be apparent to one skilled in the art that suitable changes in the described dimensions and pressures will be required for containers of different sizes and made of different materials. Also, the containers can be handled with the open end either up or down.

Another feature of this apparatus is its ability to eject any tipped cans which come into it from infeed table I. As seen in FIGS. 14 and 15, if a container 10' is tipped over on its side, the high air pressure at the center of the divergent section, as well as divergent jets 70 will cause the can to roll over to the side rails and be rolled up over the lower rail 64 to be discharged off the side of the apparatus into a receptacle (not shown).

The apparatus which has been described is very versatile and can be used in its entirety, in segments or in multiples in order to accomplish different results. For example, after the containers pass through the divergent zone, the transporting zone and into the converging zone, rather than being converged, the separate rows of containers can be fed directly to different apparatus, such as a line of internal coaters and sprayers. If the apparatus which one row of containers is feeding should become inoperable or interrupted for a period of time, the movement of the other row of containers will not be affected. Thus, a continuous supply of cans in single file row can be provided to multiple locations.

Conversely, the apparatus of this invention can be combined in multiple units as shown in FIG. 16. By this arrangement, the single file output at the end can be doubled from what is available from either of the divergent single filers. As viewed in FIG. 16, it can be seen that the output of containers from two separate alignment zones can be directed into a converging unit 242 which has converging pathways 244 and 246 for bringing the containers into a third alignment zone wherein the separate rows of containers will be merged and arranged in single file as previously described.

From the foregoing, the advantages of this invention are readily apparent. Highly etched containers can be moved from a mass into single file at speeds heretofore not possible. The principal upon which this is accomplished is to separate the containers from each other when they are to be broken down into a smaller width mass and then move that mass as a unit to a subsequent station where they are separated from each other and further merged until they are finally brought into single file. This is accomplished by using diverging jets to separate the containers into separate rows wherein the rows and an imperforate cover form a high pressure zone between the containers. A differential pressure is provided which is higher at the downstream end of this central area so that any containers that move into the central area will also move upstream toward the mass of containers for recirculating into the rows. The two rows of containers are brought into nesting relationship and finally into an equilateral triangular configuration in which adjacent containers are in contacting relationship whereupon they are moved into a high pressure area and separated by means of acceleration jets and the high pressure zone and converged by converging sidewalls into single file.

This invention has been described in detail with reference to a particular embodiment thereof, but it will be understood that various other modifications can be effected within the spirit and scope of this invention.

I claim:

1. A method of transporting upright, cylindrical articles, wherein each article has an exterior surface with a high coefficient of friction with respect to an adjacent article that substantially inhibits relative sliding motion of one article with respect to an adjacent contiguous article, in a wide mass at an upstream location along an air table and into single file at a downstream location, said method comprising:
   separating the articles into two spaced apart single file rows at the upstream location;
   converging the spaced rows into contiguous nested rows of articles as they move downstream;
   moving the nested two rows of articles downstream as a unit;
   accelerating the articles in the two nested rows as they move downstream to separate them each from the other; and
   converging the articles into single file while they are separated as they move to the downstream location.

2. The method, as claimed in claim 1, wherein said separating step includes:
   creating a high air pressure zone at the center of the air table to separate the articles into the two spaced rows.

3. The method, as claimed in claim 1, wherein said accelerating step includes:

providing a high pressure zone where the articles are accelerated, wherein the pressure in said high pressure zone decreases in the downstream direction.

4. A method of transporting upright, cylindrical articles, wherein each article has an exterior surface with a high coefficient of friction with respect to an adjacent article that substantially inhibits relative sliding motion of one article with respect to an adjacent contiguous article, in a wide mass at an upstream location along an air table and into a pair of spaced single file rows at a downstream location, said method comprising:

provides a pair of side guide rails along opposite sides of the table which extend from the upstream location to the downstream location and are spaced apart a distance in excess of three article diameters at the upstream location and an imperforate cover above the table a distance just greater than the height of the articles and extending over the guide rails;

providing a central barrier at the downstream location which forms a single file lane along each guide rail for the articles and provides a plenum for the introduction of air pressure into the central area between separate rows of articles along each guide rail;

introducing air at high volume and a low flow rate at the barrier to direct articles in the central area toward the upstream location;

urging the articles along the side rails in a downstream direction to form a continuous row along each guide rail; and reducing the pressure in the central area at the upstream location.

5. A method, as claimed in claim 4, including the further step of:

floating any articles which get in the central area on a layer of air so that the differential air pressure in the central area will cause those articles to move back toward the upstream location.

6. A method, as claimed in claim 5, including the further step of:

urging the articles, which move upstream along the central area, toward the side rails at the upstream location.

7. Apparatus for converging a mass of upright cylindrical articles from a wide mass at an upstream location into single file at a downstream location, wherein each article has an exterior surface with a high coefficient of friction with respect to an adjacent article, said apparatus comprising:

a table having a centerline and a plurality of zones extending from said upstream location to said downstream location, said table having a surface, first and second opposite side edges and an underside with a prearranged pattern of flotation air jets communicating said surface and said underside;

a lower plenum means connectable to a source of air under pressure and attached to said underside of said table surface;

means for separating the articles into two separate spaced rows of loosely arranged articles at a first zone;

means for conveying the spaced rows through a second zone and bringing the articles in each row into tight contiguous contacting relationship;

means for arranging the spaced rows in a third zone;

means for converging the spaced rows into nested relationship and moving them as a unit in a fourth zone; and means for subsequently accelerating the articles to separate them and converging them into single file in said fourth zone.

8. Apparatus, as claimed in claim 7, wherein said lower plenum means includes a lower master plenum located under said table and substantially coextensive therewith and said separating means in said first zone comprises:

a first lower plenum substantially coextensive with said first zone and in communication with said master plenum, and having first, second and third lateral sections;

first damper means to control flow of air from said master plenum to said first lower plenum;

a first set of flotation jets parallel to one of said edges which are angled in the downstream direction in communication with said first section of said first lower plenum and positioned under one spaced row of articles for conveying them toward said downstream location;

a second set of flotation jets parallel to said other of said edges which are angled in the downstream direction in communication with said second section of said first lower plenum and positioned under the other spaced row of articles for conveying them toward said downstream location;

a third set of flotation jets between said first and second sets of flotation jets in communication with the third section of said first lower plenum, the jets on the side of said centerline closest said one side being angled toward said one side and the jets on the side of said centerline closest said other side being angled toward said other side so that any article over said third set of flotation jets will be urged toward one of said side edges; and exhaust means in said cover over said third set of flotation jets to create an area therebetween of reduced high pressure so that articles which enter the reduced high pressure area tend to move upstream toward said upstream location to reenter the wide mass of articles.

9. Apparatus, as claimed in claim 8, wherein said first damper means comprises:

a first and second damper for said first and second lateral sections operated by a common control; and a third damper for said third lateral section operated by a separate control.

10. Apparatus, as claimed in claim 8, wherein said upper plenum means further includes:

a first longitudinal upper plenum along one edge of said table above said cover, said cover forming the bottom wall of said first longitudinal upper plenum;

a first longitudinal row of air jets in said first longitudinal upper plenum extending through said cover in a downstream direction above said first sets of flotation jets;

a second longitudinal upper plenum along said other edge of said table above said cover, said cover forming the bottom wall of said second longitudinal upper plenum;

a second longitudinal row of air jets in said second longitudinal upper plenum extending through said cover in a downstream direction above said second sets of flotation jets; and means supplying air under pressure to said first and second longitudinal upper plenums so that air from said first and second rows of air jets assist in balancing and moving the articles along their respective rows.

11. Apparatus, as claimed in claim 10, wherein said exhaust means includes:
an exhaust plenum between said first and second longitudinal upper plenums;
a plurality of exhaust openings in said cover for exhausting air into said exhaust plenum; and
an outlet in said exhaust plenum.

12. Apparatus, as claimed in claim 11, wherein said exhaust openings are in greater numbers toward the upstream end of said cover, further including:
a damper in said outlet for controlling the air pressure over said third set of flotation jets.

13. Apparatus, as claimed in claim 10, wherein said means for supplying air under pressure to said first and second longitudinal upper plenums comprises:
an upper master plenum in communication with each of said first and second longitudinal upper plenums; and
baffle means for controlling the flow of air into said upper master plenum.

14. Apparatus, as claimed in claim 8, wherein said means for conveying in said second zone further includes:
a second lower plenum substantially coextensive with said second zone and in communication with said lower master plenum, said second lower plenum having first, second and third lateral sections;
second damper means to control flow of air from said lower master plenum to said second lower plenum; and
first, second and third sets of flotation jets in communication with said second lower plenum which jets are a continuation of said first, second and third sets of flotation jets in said first zone, except that said flotation jets in said third zone are substantially perpendicular.

15. Apparatus, as claimed in claim 14, wherein said second damper means comprises:
a first and second damper for said first and second lateral sections operated by a common control; and
a third damper for said third lateral section operated by a separate control.

16. Apparatus, as claimed in claim 15, further including:
a second zone upper plenum substantially coextensive with said second zone, said cover forming the bottom wall of said second zone upper plenum;
a first longitudinal row of air jets in said second zone upper plenum extending through said cover in a downstream direction above said first sets of flotation jets and being aligned with and an extension of said first longitudinal row of air jets in said first longitudinal upper plenum;
a second longitudinal row of air jets in said second zone upper plenum extending through said cover in a downstream direction above said second set of flotation jets and being aligned with and an extension of said second longitudinal row of air jets in said second longitudinal upper plenum; and
damper means to adjust the flow of air into said second zone upper plenum.

17. Apparatus, as claimed in claim 16, wherein said third zone comprises:
baffle means at the downstream end of said third zone between said table and said cover defining the downstream end of a high pressure area over said third set of flotation jets.

18. Apparatus, as claimed in claim 17, further including:
means for introducing air at high volume into said high pressure area, said air having a pressure which is greater than the air pressure at said exhaust means so that articles in the high pressure area will move toward said exhaust means, said pressure at said baffle means being less than the air pressure in said plenums.

19. Apparatus, as claimed in claim 18, wherein said baffle means includes:
a first baffle spaced from and parallel to one of said edges, said spacing being just greater than the diameter of the articles;
a second baffle spaced from and parallel to said other edge, said spacing being just greater than the diameter of the articles; and
a cross baffle between said first and second baffles.

20. Apparatus, as claimed in claim 19, wherein:
said third lateral section of said second lower plenum and said third set of flotation jets extend into the central portion of said third zone and said third lateral section is substantially coextensive with said high pressure area defining means.

21. Apparatus, as claimed in claim 20, wherein said means for arranging the spaced rows in said third zone further comprises:
a third lower plenum having first and second portions on opposite sides of said third portion of said second lower plenum;
a first and second set of flotation jets in communication with said third lower plenum which are a continuation of said first and second sets of flotation jets in said second zone; and
first and second damper means controlling the flow of air into said first and second portions of said third lower plenum operated by a single control.

22. Apparatus, as claimed in claim 7, wherein said fourth zone comprises:
a nesting section for receiving the spaced rows of articles from said third zone and bringing them into contiguous equilateral configuration;
opposed converging guides, each having a pair of vertically spaced rails for urging the articles into nesting relationship;
a buffer section for receiving the contiguous nested rows of articles from said nesting section;
converging, imperforate side walls extending along said table through said buffer section to reduce the articles from a two article width at said nesting section to single file adjacent said downstream location;
an imperforate cover over said buffer section to create a high pressure area within said buffer section to facilitate separation of the articles therein;
means for selectively decreasing the air pressure in said buffer section from a point spaced downstream from said nesting section to said downstream location; and
acceleration jets in said table along said buffer section for accelerating the articles so that they can be converged by said side walls into single file as they are separated from the contiguous triangular configuration.

* * * * *